United States Patent
Eldred et al.

(10) Patent No.: US 9,175,210 B2
(45) Date of Patent: *Nov. 3, 2015

(54) PROPPANT PARTICLES FORMED FROM SLURRY DROPLETS AND METHOD OF USE

(75) Inventors: Benjamin T. Eldred, Houston, TX (US); Brett A. Wilson, Cypress, TX (US); Clayton F. Gardinier, Houston, TX (US); Robert J. Duenckel, Southlake, TX (US)

(73) Assignee: CARBO Ceramics Inc., Houston, TX (US)

( * ) Notice: Subject to any disclaimer, the term of this patent is extended or adjusted under 35 U.S.C. 154(b) by 832 days.

This patent is subject to a terminal disclaimer.

(21) Appl. No.: 13/045,980

(22) Filed: Mar. 11, 2011

(65) Prior Publication Data

US 2012/0227968 A1   Sep. 13, 2012

(51) Int. Cl.
*C09K 8/80* (2006.01)
*B29B 9/10* (2006.01)

(52) U.S. Cl.
CPC .. *C09K 8/805* (2013.01); *B29B 9/10* (2013.01)

(58) Field of Classification Search
CPC ...... C09K 8/512; C09K 8/5083; C09K 8/882; C09K 8/887; C09K 8/68; C09K 2208/18; C09K 2208/30; C09K 8/06; C09K 8/506; C09K 8/508; C09K 8/52; C09K 8/62; C09K 8/805; C09K 8/685; C09K 8/80; C09K 8/035; C09K 8/72; C09K 8/86; C09K 2208/32; C09K 3/1409; C09K 8/74; C09K 3/00; C09K 3/1418; C09K 5/14; C09K 8/03; C09K 8/10; C09K 8/50; C09K 8/66; C04B 33/04; C04B 35/111; C04B 2235/349; C04B 35/6262; E21B 43/267
See application file for complete search history.

(56) References Cited

U.S. PATENT DOCUMENTS

| | | | |
|---|---|---|---|
| 2,596,843 A | 5/1952 | Farris | |
| 2,596,844 A | 5/1952 | Clark | |
| 4,427,068 A | 1/1984 | Fitzgibbon | |
| 4,440,866 A | 4/1984 | Lunghofer et al. | |
| 4,657,754 A | 4/1987 | Bauer et al. | |
| 4,713,203 A * | 12/1987 | Andrews | C04B 35/10 166/280.2 |
| 4,894,285 A | 1/1990 | Fitzgibbob | |
| 5,021,201 A | 6/1991 | Eguchi et al. | |
| 5,114,695 A | 5/1992 | Jain et al. | |
| 5,420,086 A | 5/1995 | Brandau et al. | |
| 5,472,648 A | 12/1995 | Alisch et al. | |
| 5,484,559 A * | 1/1996 | Johns | G01F 11/023 264/13 |
| 5,500,162 A * | 3/1996 | Theisen | B01J 13/043 264/14 |
| 5,833,361 A | 11/1998 | Funk | |
| 6,197,073 B1 | 3/2001 | Kadner et al. | |
| 6,753,299 B2 * | 6/2004 | Lunghofer | C04B 33/04 166/280.2 |
| 7,036,591 B2 | 5/2006 | Cannan et al. | |
| 7,160,844 B2 | 1/2007 | Urbanek | |
| 7,678,723 B2 | 3/2010 | Duenckel et al. | |
| 7,776,255 B1 * | 8/2010 | Wedding | B22F 1/0051 419/29 |
| 7,825,053 B2 | 11/2010 | Duenckel et al. | |
| 2003/0099740 A1 * | 5/2003 | Colle | A23G 4/20 426/3 |
| 2004/0007789 A1 * | 1/2004 | Vlach | B01J 2/06 264/8 |
| 2005/0096207 A1 | 5/2005 | Urbanek | |
| 2006/0016598 A1 | 1/2006 | Urbanek | |
| 2006/0162929 A1 * | 7/2006 | Urbanek | C04B 35/443 166/280.2 |
| 2007/0036977 A1 * | 2/2007 | Sinclair | C09K 8/805 428/403 |
| 2007/0144736 A1 | 6/2007 | Shinbach et al. | |
| 2008/0015103 A1 | 1/2008 | Luscher et al. | |
| 2008/0058228 A1 * | 3/2008 | Wilson | C04B 33/04 507/140 |
| 2008/0087429 A1 * | 4/2008 | Brannon | C09K 8/62 166/280.1 |
| 2008/0135245 A1 * | 6/2008 | Smith | C04B 35/04 166/280.2 |
| 2008/0182765 A1 | 7/2008 | Pershikova et al. | |
| 2008/0210421 A1 | 9/2008 | Wilson et al. | |
| 2008/0220996 A1 | 9/2008 | Duenckel et al. | |
| 2008/0234146 A1 | 9/2008 | Barmatov et al. | |
| 2008/0241540 A1 * | 10/2008 | Canova | B01D 1/18 428/402 |
| 2009/0038797 A1 * | 2/2009 | Skala | C09K 8/80 166/280.1 |
| 2009/0044941 A1 * | 2/2009 | De Paiva Cortes | C04B 35/10 166/280.1 |
| 2009/0118145 A1 | 5/2009 | Wilson et al. | |
| 2009/0205824 A1 * | 8/2009 | Sullivan | C09K 8/512 166/278 |
| 2009/0227480 A1 | 9/2009 | de Paiva Cortes et al. | |
| 2010/0126728 A1 | 5/2010 | Duenckel et al. | |
| 2012/0000653 A1 | 1/2012 | Panga et al. | |
| 2012/0018162 A1 | 1/2012 | Tanguay et al. | |
| 2012/0190597 A1 | 7/2012 | Chatterjee et al. | |

(Continued)

FOREIGN PATENT DOCUMENTS

| | | |
|---|---|---|
| EP | 0116369 | 8/1984 |
| WO | 9207653 | 5/1990 |
| WO | 9302785 | 2/1993 |

OTHER PUBLICATIONS http://en.wiktionary.org/w/index.php?title=reactant&printable=yes downloaded on Jul. 15, 2014.*

(Continued)

*Primary Examiner* — Susannah Chung
*Assistant Examiner* — Kumar R Bhushan
(74) *Attorney, Agent, or Firm* — John C. Douglas

(57) ABSTRACT

Proppant material for hydraulic fracturing is provided. The particles of the proppant are formed by drip casting. A slurry of finely divided ceramic particles is flowed through nozzles and formed into droplets under the influence of vibration. Uniform sized, smooth surface, spherical green particles are formed. The green particles are dried and sintered to form the proppant. The proppant is used in the process of hydraulic fracturing of wells.

27 Claims, 5 Drawing Sheets

(56) References Cited

U.S. PATENT DOCUMENTS

2012/0227968 A1 9/2012 Eldred et al.
2013/0081812 A1 4/2013 Green et al.

OTHER PUBLICATIONS http://water.me.vccs.edu/concepts/coagulantchemicals.html downloaded on Jul. 15, 2014.*
Sigma-Aldrich Particle size conversion table.*
Yaparpalvi, R. et al., "Drop Formation under Pulsed Conditions", Chemical Engineering Science, vol. 41, No. 10, p. 2547-2553, 1986.
Zainuddin, M. Imran, et al., "Correlation between slurry properties and structures and properties of granules", Journal of the European Ceramic Society 30, 2010, p. 3291-3296.
Guimard, Pierre, et al., "Correlation of Surface Roughness and Pressure Drop for Flow Through Packed Beds", 06-363 Transport Process Laboratory, Carnegie Mellon University, May 4, 2004.
BRACE, "Microshpere Units," Jan. 21, 2011.
BRACE, "Spherisator S," Jan. 21, 2011.
BRACE, "Microshperes Technology and Applications", brochure.
Notice of Transmittal of the International Search Report and The Written Opinion of the International Searching Authority, or the Declaration; Aug. 16, 2012, Patent Cooperation Treaty, pp. 1 thru 16.
Notice of Transmittal of the International Search Report and The Written Opinion of the International Searching Authority, or the Declaration; and Search History, Jan. 24, 2014, Patent Cooperation Treaty, pp. 1 thru 17.
International Search Report and Written Opinion of the International Searching Authority for PCT/US2013/058763 dated Jan. 24, 2014, 17 pgs.
International Search Report and Written Opinion of the International Searching Authority for PCT/US2012/08308 dated Aug. 16, 2012, 16 pages.
Office Action and Search Report for Chinese Patent Application No. 201280012640.3 mailed Apr. 15, 2015, 22 pages.
Office Action for Chinese Patent Application No. 201280012640.3 mailed Aug. 28, 2014, 5 pages.
Supplemental European Search Report and European Search Opinion for EP Application No. 12758225.2 mailed Sep. 14, 2015, 8 pages.

* cited by examiner

PROPPANT PARTICLES FORMED FROM SLURRY DROPLETS AND METHOD OF USE

BACKGROUND OF INVENTION

1. Field of the Invention

This invention relates to hydraulic fracturing of subterranean formations in the earth. More particularly, sintered ceramic proppant particles formed from vibration-induced dripping from a nozzle of a slurry of finely-divided ceramic material are provided, along with a method of use of the particles.

2. Description of Related Art

Hydraulic fracturing is a process of pumping liquids down a well and into a subterranean formation at high rate and pressure, such that a fracture is formed in the rock around the well. After pumping a liquid volume sufficient to widen the fracture adequately, solid particles, called "proppant," are added to the liquid. After pumping is completed, the well is opened for production of hydrocarbons. The production rate of fluid from the well is usually significantly increased after the fracturing treatment. Vast improvements in the hydraulic fracturing process have been developed since the process was originally patented in 1949. (U.S. Pat. Nos. 2,596,843 and 2,596,844)

The material first used for proppant in hydraulic fracturing of wells was silica sand. As wells became deeper, sand was found to have inadequate strength. In deep wells, stress of the earth causes the sand to crush and become much less effective in increasing the production rate of a well.

Synthetic proppant materials were developed to provide higher strength proppants. The original synthetic sintered proppant was sintered bauxite. In later years, a variety of ceramic raw materials have been used to make sintered ceramic proppants, including bauxite containing lesser amounts of alumina and clay minerals, such as kaolin. Generally, it has been found that the strength of ceramic particles increases with the amount of alumina in the particle, all other factors remaining constant.

A general procedure for making synthetic proppant particles is to obtain the ceramic raw material, grind it to a fine powder, form it into pellets (called "green" pellets), and sinter the green pellets in a kiln. The final product is ceramic pellets in the size range suitable for proppants—from about 70 mesh to 12 mesh (0.008 inch to 0.067 inch). Different sizes of pellets are used depending on well conditions.

A variety of processes for forming the pellets of a proppant have been proposed. In early work, U.S. Pat. No. 4,427,068 describes a process for forming sintered ceramic pellets by adding dry powders of clay and alumina, bauxite, or mixtures to a high intensity mixer (hereinafter referred to as "dry mixing method"). Powdered fine grain ceramic starting ingredients (ceramic raw materials) are stirred to form a dry homogenous mixture. Then, sufficient water is added to cause agglomeration of the fine starting dust particles to form small composite spherical pellets from the powder. Continued mixing time is allowed in order to grow small pellets to the desired size. A broad range of sizes is produced during the pellet-forming stage. A preferred mixing device is obtained from Eirich Machines, Inc., and is known as the Eirich mixer. The resulting pellets are dried and sintered into the final proppant particles. Much of the ceramic proppant made in industry in past years has been made with this process of forming pellets.

U.S. Pat. No. 4,440,866 discloses an alternative process for producing pellets that are sintered to produce high strength pellets. A continuous spray/granulation of an aqueous binder containing aluminous ore suspension is used to form granules that are subsequently sintered (hereinafter referred to as "spray fluidized bed method"). All steps of this process may be carried out in a continuous manner. An aqueous suspension containing the ceramic raw material is continuously atomized and fed into a layer of already partially dried small starting dust particles (often called seeds) that are fluidized in a stream of hot drying air. The aqueous ceramic raw material suspension is continuously sprayed and dried onto the seed particles until the desired finished green particle diameter is achieved. Particles produced in this process have a size range that is less broad than those typically produced by the dry mixing method of U.S. Pat. No. 4,427,068 but are still of sufficient variation as to require further processing. Particles are continuously recovered from the layer and they are separated from oversized and undersized product fractions. Material is continuously recycled in the stream of drying air. This spray fluidized bed process has also been used to produce large amounts of ceramic proppants in industry.

The pellet-forming methods described above have intrinsic limitations. The dry mixing process produces an extremely wide range of green pellet sizes due to the random nature of the agitation of the rotor and pan. The spray fluidized bed process produces a somewhat tighter green pellet size distribution but still a much wider distribution than desired. These processes require extensive screening and recycling during the manufacturing process. Under the best manufacturing conditions about 30% of green particles must be recycled through the pellet-forming process. Both the dry mixing and spray fluidized bed processes also produce a random distribution of pore sizes in pellets, including a small percentage of very large pores that significantly degrade pellet strength. Strength of the sintered pellets is a primary consideration, because if the pellets break under high stress in a fracture, the flow capacity of the fracture is decreased and the hydraulic fracturing treatment is less effective. The sphericity and surface smoothness of particles produced by these processes are also important, with high sphericity and a very smooth surface traditionally being most desirable. All of these characteristics are strongly affected by the pellet-forming method.

U.S. Pub. No. 2006/0016598 discloses a list of pellet-forming techniques that may be used for ceramic proppant formation, including agglomeration, spray granulation, wet granulation, extruding and pelletizing, vibration induced dripping according to U.S. Pat. No. 5,500,162, spray nozzle-formed droplets and selective agglomeration. U.S. Pat. No. 5,500,162 discloses producing microspheres by vibration-provoked dripping of a chemical solution through a nozzle plate, wherein the falling drops form an envelope surrounded from all sides by flowing reaction gas. The liquid chemical solution has no or low (i.e. 20% or less) solid particles at the time it enters the nozzle plate, exits the nozzle plate, and passes through the first free fall section. The reaction gas is required to cause the precipitation (gelling) of small solid particles (typically sub-micron) in the liquid drops as they fall through the second free fall zone, and thereafter fall into a reaction liquid to further gel. The reaction gas is necessary to cause the liquid to partially gel prior to entering the reaction liquid, and the droplets are decelerated into the liquid through a foam or the reaction liquid is directed onto the falling drops tangentially in the same direction in which the droplets are falling. These two features of falling through reaction gas and decelerating the droplets into foam are required to insure the droplets are partially gelled during a sol-gel reaction and therefore not deformed, for example flattened, when they strike the reaction liquid. The reaction gas is sucked away inside or outside the envelope. The method according to the invention can be used to produce, for example, aluminum oxide spheres up to the diameter of 5 mm.

Vibration-induced dripping, herein called "drip casting," was originally developed to produce nuclear fuel pellets. Since then it has been adapted to produce a very wide variety of metal and ceramic microspheres, such as grinding media and catalyst supports. Primarily, it has been used in the food and pharmaceuticals industries. The drip casting process is described on the website and in sales literature of Brace GmbH. Examples of "microspheres" formed by drip casting of different materials are also provided. U.S. Pat. No. 6,197,073 discloses a process for producing aluminum oxide beads from an acid aluminum oxide sol or acid aluminum oxide suspension by flowing the suspension through a vibrating nozzle plate to form droplets and pre-solidifying the droplets with gaseous, ammonia and then coagulating the droplets in an ammonia solution. The mechanical strength of ceramic particles formed by sintering the drip cast particles was not a factor in any of the materials used in these references.

It is known that to produce ceramic proppant particles having maximum strength for a given ceramic material, the particles must contain minimum porosity, and the pores present must be kept as small as possible, since the strength of a given proppant particle is limited by its largest pore. What is needed is a method of forming green ceramic particles that can be fired to have reduced pore size and therefore maximum strength for use as a proppant. Preferably, the particles should be spherical, have a smooth surface and have uniform size. A method for forming the green particles without recycling of the undesired size fraction of green ceramic pellets is also needed.

BRIEF SUMMARY OF THE INVENTION

A method for forming proppant pellets from a slurry of ceramic raw materials is provided. The pellets produced have superior strength to prior proppant pellets made from a variety of ceramic raw materials using prior art pellet-forming methods. Uniform sized spherical pellets having a smooth surface may be made in commercial quantities. The particles are used in hydraulic fracturing treatments of wells.

BRIEF DESCRIPTION OF THE SEVERAL VIEWS OF THE DRAWING(S)

DETAILED DESCRIPTION

Figure 1:
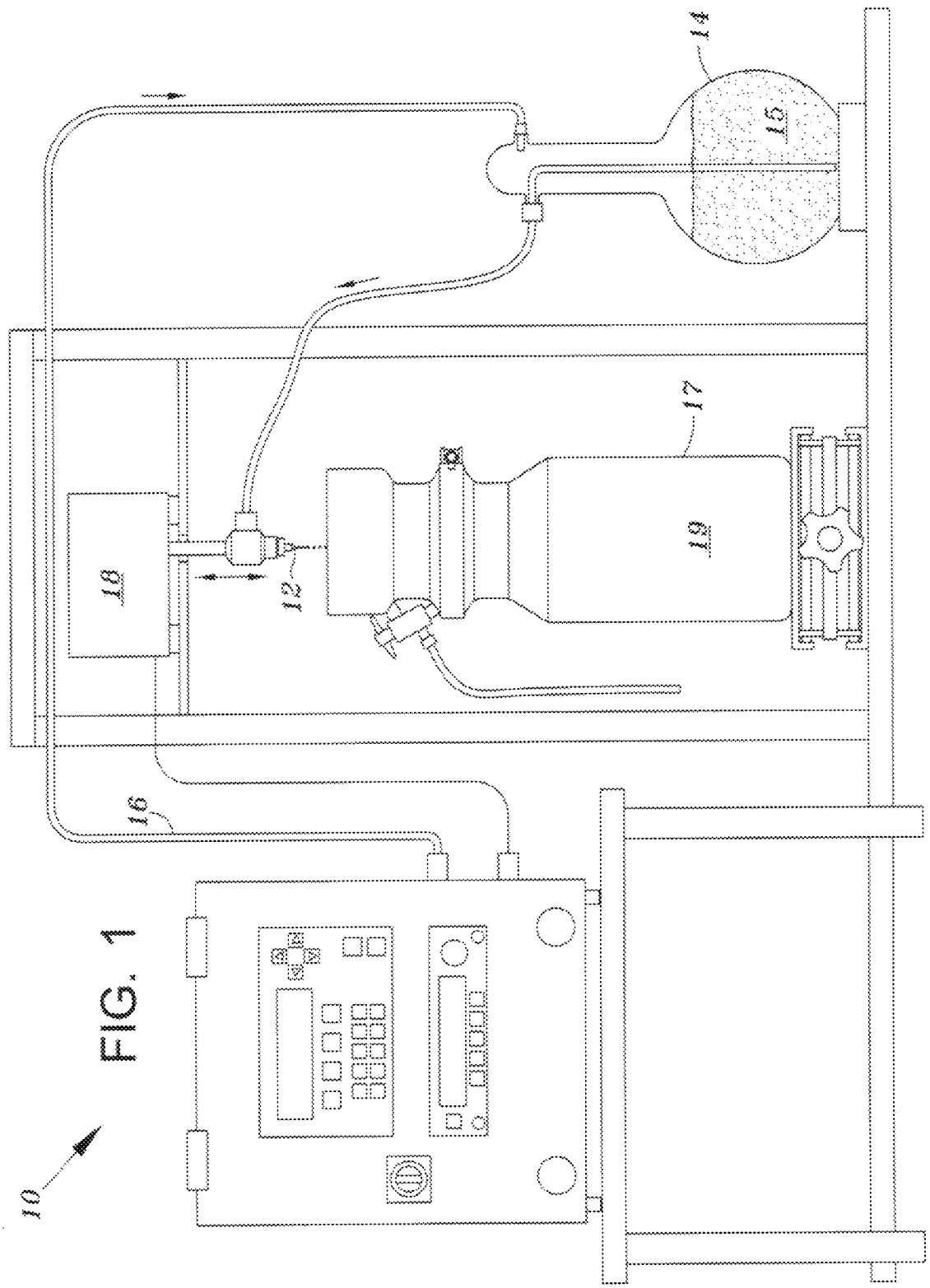
FIG. 1 is a sketch showing the principles of the pellet-forming apparatus for proppant pellets disclosed herein.

Referring to FIG. 1, pellet-forming apparatus 10 having a single nozzle is shown to illustrate the principles of the method disclosed herein, which is commonly called "drip casting." Nozzle 12 receives slurry 15 from feed tank 14, which contains the ceramic raw materials suspended in water. Pressure applied to feed tank 14 by pressure supply system 16 causes slurry to flow through nozzle 12 at a selected rate—preferably in laminar flow. Below nozzle 12 is coagulation vessel 17, which receives the droplets. Vibrator unit 18 is connected to nozzle 12 and is used to supply pressure pulses to the nozzle or directly in the slurry flowing to the nozzle. The resulting vibration of the slurry flow through the nozzle causes the stream exiting the nozzle 12 to break into droplets of uniform size. As droplets fall toward coagulation vessel 17, surface tension effects tend to form the droplets into spheres. Spherical particles are formed without the necessity of a sol-gel reaction, reaction gas free fall zone, foamed layer of reaction liquid or reaction liquid directed onto the droplets prior to entering the reaction liquid bath.

Figure 2:
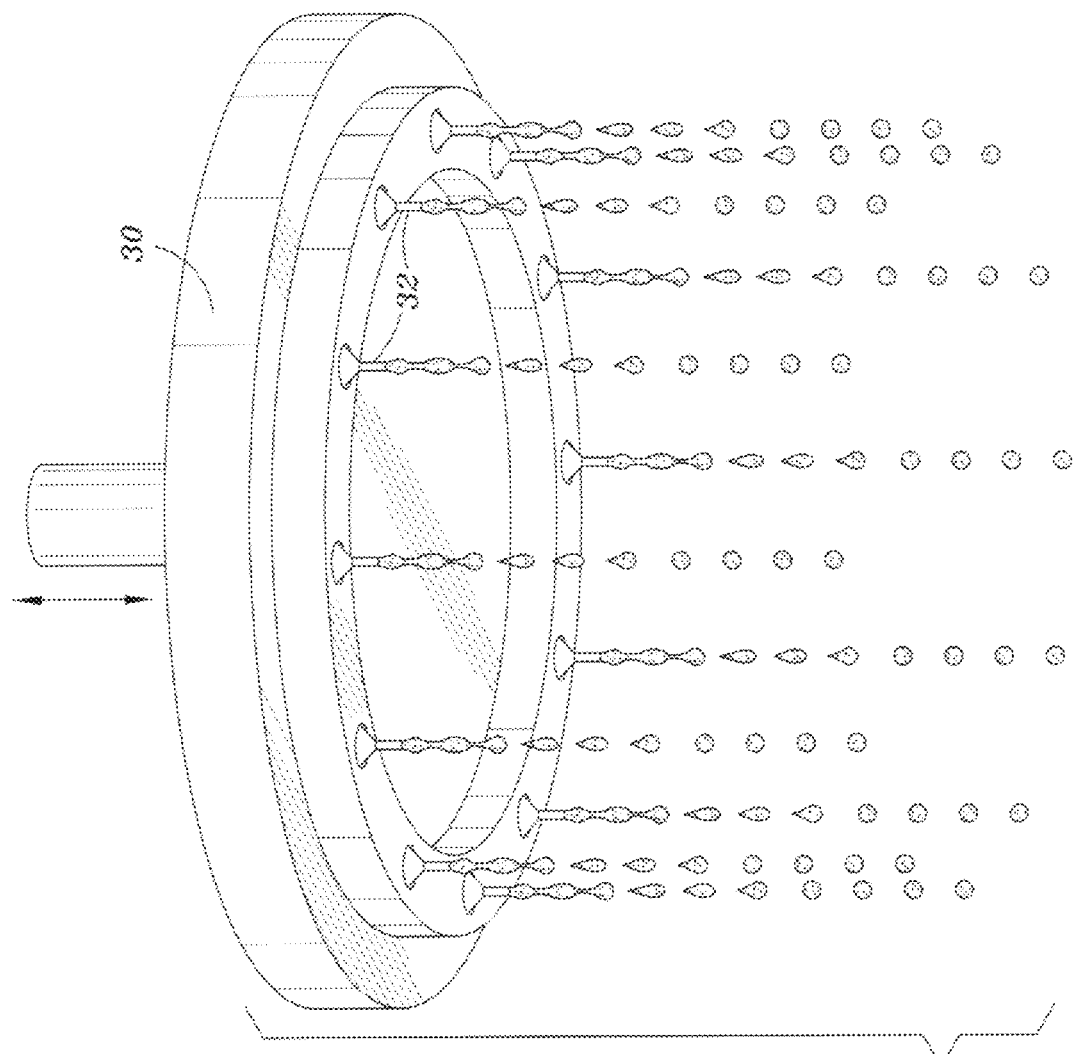
FIG. 2 is a sketch showing a single nozzle forming droplets from a slurry stream.

FIG. 2 shows details of slurry 15 exiting nozzle 12 and breaking into drops. Surface tension of the slurry drives the drops toward minimum surface area, which is acquired in a spherical shape, as they fall toward coagulation vessel 17. The distance of fall is preferably selected to be great enough to allow the droplets to become spherical before entering a liquid in vessel 17.

Slurry 15 from feed tank 14 contains a finely ground (0.01-50 microns in size) mineral or processed powder capable of producing a strong ceramic material after sintering, a proper amount of dispersant necessary for keeping the solid particles in the slurry well separated, water, and a reactant that will react with a component in liquid 19 in coagulation vessel 17 to form a semi-solid or insoluble compound. The solids content of the slurries may range from about 25% to about 75%. The viscosity of the slurries may be from 1 to 1,000 centipoise. Lower viscosity of the slurry aids in improving droplet formation and formation of spherical particles and is an essential part of the invention claimed. Optimization of the dispersant type and concentration will reduce viscosity. Dispersants may be selected based on cost, availability and effectiveness in reducing viscosity of a selected slurry. Dispersants that may be used to reduce the viscosity of slurries include sodium silicate, ammonium polyacrylate, sodium polymethacrylate, sodium citrate sodium polysulfonate and hexametaphosphate.

The commonly used reactant chemical in the slurry in feed tank 14 is sodium alginate. This is a naturally occurring polysaccharide that is soluble in water as the sodium salt but is cross-linked to form a gel as the calcium salt. Alginate is typically added to the slurry at levels of 0.1% to 1.0% (weight percent alginate solid to total slurry). Coagulation tank 17 normally contains a coagulation liquid 19 which gels the reactant chemical in the slurry 15. The commonly used coagulation liquid for sodium alginate is a calcium chloride solution at concentration levels of 0.5% to 10% by weight. A variety of reactants in the slurry flowing through nozzle 12 and in the coagulation vessel 17 may be used. This may include other polysaccharides and other cross-linking compounds such as polyvinyl alcohol or borate fluids.

The diameter of nozzle 12, the viscosity of slurry 15, the ceramic particle content of slurry 15, pressure to feed the slurry to the nozzle, along with the frequency and amplitude of vibration applied by vibrator source 17 are adjusted to produce droplets having a desired size. These variables are preferably set at a constant value as spheres are produced to be formed into a batch of pellets of propping material. Different batches may be produced having different size pellets. Preferably, each batch will be monosized (i.e. contained on a single sieve such as passing through a 20 mesh sieve but staying on a 25 mesh sieve). The pressure used to feed slurry to the nozzle is adjusted to create laminar flow through the nozzle. The feed pressure can range from 1 to 50 psi. The frequency is adjusted for each set of slurry conditions such that a resonance is established in the slurry stream exiting the nozzle that then produces spherical droplets. The frequency can range from 10 to 20,000 Hz. The pressure and frequency are optimized iteratively to create uniform spherical shapes. The amplitude is adjusted to improve the uniform shape of the spherical droplets formed. The flow rate of the slurry through a nozzle is a function of the nozzle diameter, slurry feed pressure, and the slurry properties such as viscosity and density. For example, for kaolin and alumina slurries through nozzles up to 500 microns in diameter the flow rate per nozzle can range from 0.2 to 3 kg/hr.

The distance between nozzle 12 and the top of the liquid 19 in coagulation vessel 17 is selected to allow droplets to become spherical before reaching the top of the liquid. The distance can be from 1 to 20 cm, but is more typically in the range of 1 to 5 cm so as to reduce distortion of the droplet shape upon impact with the liquid surface, thereby eliminating the need for a reaction gas, foam layer, or tangentially directed reaction liquid prior to the droplets entering the coagulation vessel 17. The reactant chemical in the droplets of slurry reacts with the coagulation liquid 19 in the coagulation vessel 17 and a semi-solid surface is formed on the droplets, which helps retain the spherical shape and prevents agglomeration of the pellets. Preferably, the residence time of pellets in coagulation vessel 17 is sufficient to allow pellets to become rigid enough to prevent deformation of the spherical shape when they are removed and dried, i.e., semi-rigid. In some embodiments, pellets may fall into a coagulation liquid solution flowing vertically upward so that settling of the particle through the liquid will be retarded to produce a longer residence time in the coagulation vessel.

Particles formed using the apparatus of FIG. 1 are washed to remove excess coagulation agent and conveyed to other devices where they are dried and later sintered, using well known processes in the industry.

Figure 3:
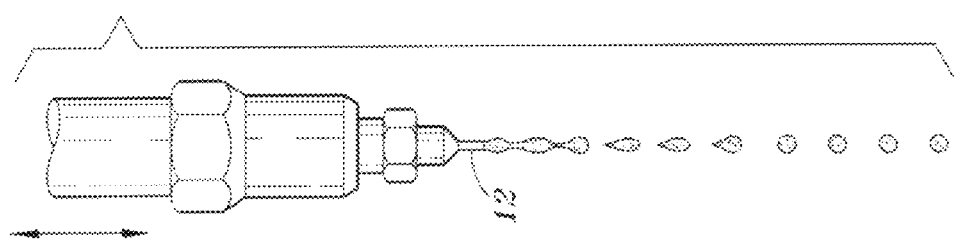
FIG. 3 is a sketch showing a multi-nozzle plate forming droplets from a slurry stream.
Figure 4A:
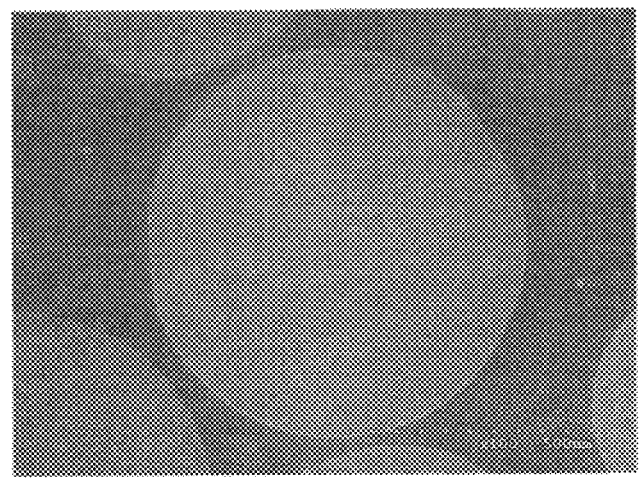
FIG. 4 shows Scanning Electron Microscope photographs at 100× of sintered pellets of alumina, bauxite and kaolin formed by the apparatus of FIG. 1 and by prior art methods.
Figure 4B:
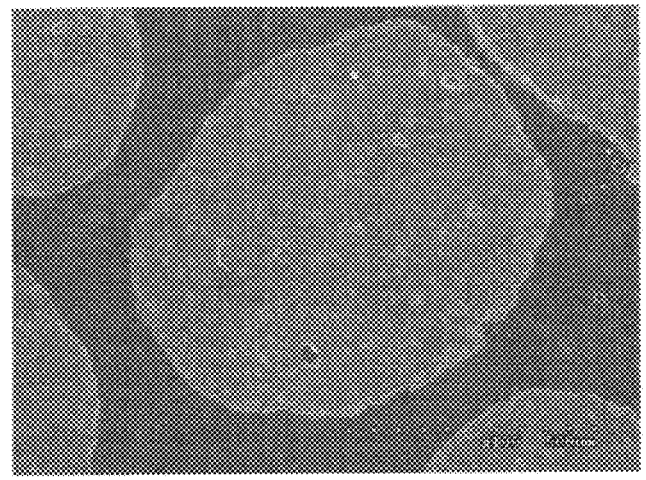
Figure 4C:
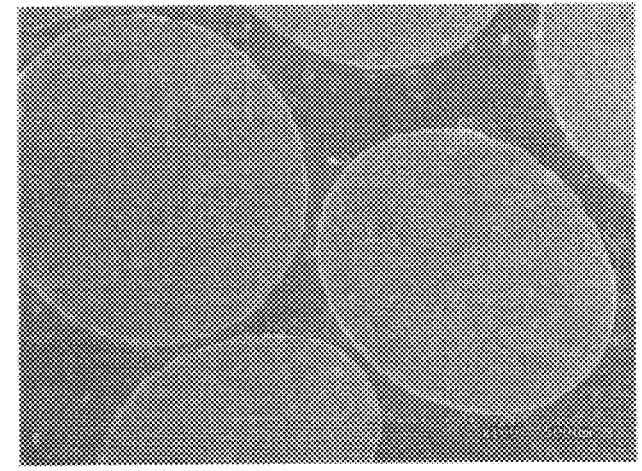
Figure 4D:
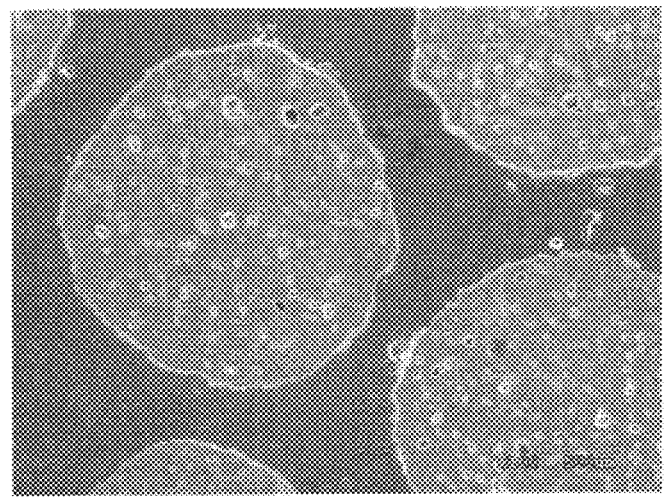
Figure 4E:
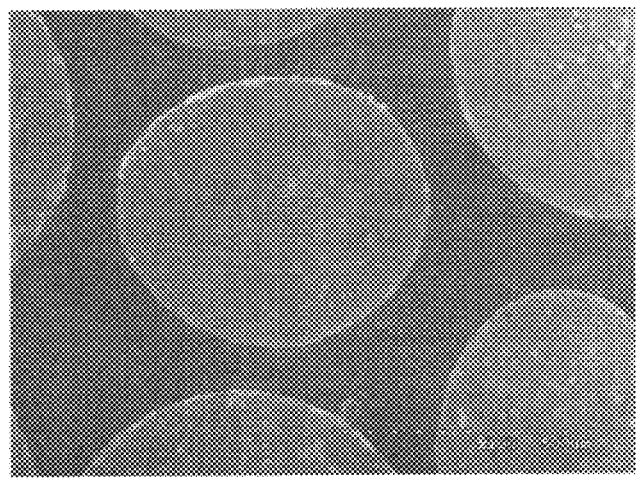
Figure 4F:
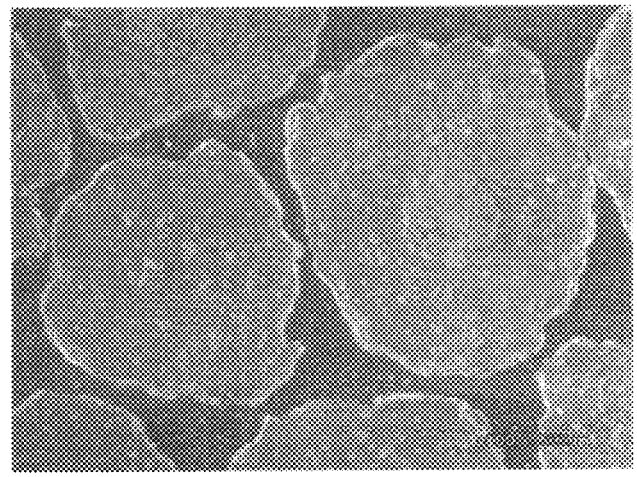

FIG. 3 illustrates how the process described above is applied in a commercial scale. Multiple nozzles 32 are placed in vessel 30, which operates under a controlled pressure to flow slurry through the nozzles. Large numbers of nozzles are required for commercial production of proppant particles. Vessel 30 is vibrated to cause vibration of nozzles, as described above. Alternatively, variable pressure may be induced in the slurry to cause formation of uniform sized droplets. The droplets are collected as described before.

Pellets produced by the process described in FIGS. 1-3 are near uniform in size. For example, Table 1 compares the pellet size distributions for sintered alumina proppant produced by the dry mixing process and by the drip casting process described herein, without screening of the green pellets. Without screening of the green pellets, dry mixing produces fired proppant with a distribution across six screens, whereas drip casting produces fired proppant substantially on one screen. Therefore, in a manufacturing process for proppant, drip casting does not require sieving the green pellets to select the size range desired and then recycling the material in green pellets outside the selected size range. The size pellets to be sintered into proppant are selected by controlling the diameter of nozzle 12 or 32, the viscosity of slurry 15, the ceramic particle content of slurry 15, pressure to feed the slurry to the nozzle, along with the frequency and amplitude of vibration applied by vibrator source 17.

TABLE 1

Sieve Distribution of Sintered Pellets Formed by Dry Mixing and Drip casting

| | 16 Mesh | 20 Mesh | 25 Mesh | 30 Mesh | 35 Mesh | 40 Mesh | 50 Mesh | Pan |
|---|---|---|---|---|---|---|---|---|
| Dry Mixing | 0% | 17.8% | 23.9% | 24.3% | 18.4% | 10.6% | 4.9% | 0% |
| Drip casting | 0% | 0% | 0.2% | 99.8% | 0% | 0% | 0% | 0% |

FIGS. 4(a-e) show photographs of aluminum oxide, bauxite, and kaolin particles produced by the apparatus of FIG. 1 and by prior art methods. FIG. 4(a) shows an alumina particle made by drip casting, as illustrated in FIG. 1, which has high sphericity and a very smooth surface. FIG. 4(b) shows an alumina particle made by an Eirich mixer. The surfaces of the particles are rough and the shapes are generally oblate. FIG. 4(c) shows a bauxite particle made by drip casting and FIG. 4(d) shows a bauxite particle made by a commercial prior art process using an Eirich mixer (Carbo HSP, sold by Carbo Ceramics Inc., Houston, Tex.). FIG. 4(e) shows a kaolin particle made by drip casting and FIG. 4(f) shows a kaolin particle made by a pilot scale fluidized bed process.

The surface roughness of each whole pellet shown in FIGS. 4(a-e) was measured. A smooth, convex perimeter was drawn around each pellet, establishing an average surface level that mimicked the actual pellet surface as closely as possible while still remaining convex. Then the separation between the actual surface and the smooth, average surface was measured around the entire perimeter at intervals of 100 μm. At 100× magnification used in FIG. 4, the separation could be measured with a precision of about 0.5 μm. The average of the measurements from the entire perimeter is representative of the surface roughness of the pellet. Table 2 shows that pellets formed by dry mixing and spray fluidized bed have surface roughness from three to seven times as large as their drip cast counterparts.

TABLE 2

Surface Roughness of Drip cast and Conventionally-Formed Pellets

| | Average Surface Roughness (μm) |
|---|---|
| Drip cast Alumina (FIG. 4a) | 1.4 |
| Dry Mixing-Formed Alumina (FIG. 4b) | 5.8 |
| Drip cast Bauxite (FIG. 4c) | 1.6 |
| Dry Mixing-Formed Bauxite (FIG. 4d) | 4.9 |
| Drip cast Kaolin (FIG. 4e) | 0.8 |
| Spray Fluid Bed-Formed Kaolin (FIG. 4f) | 5.7 |

Figure 5:
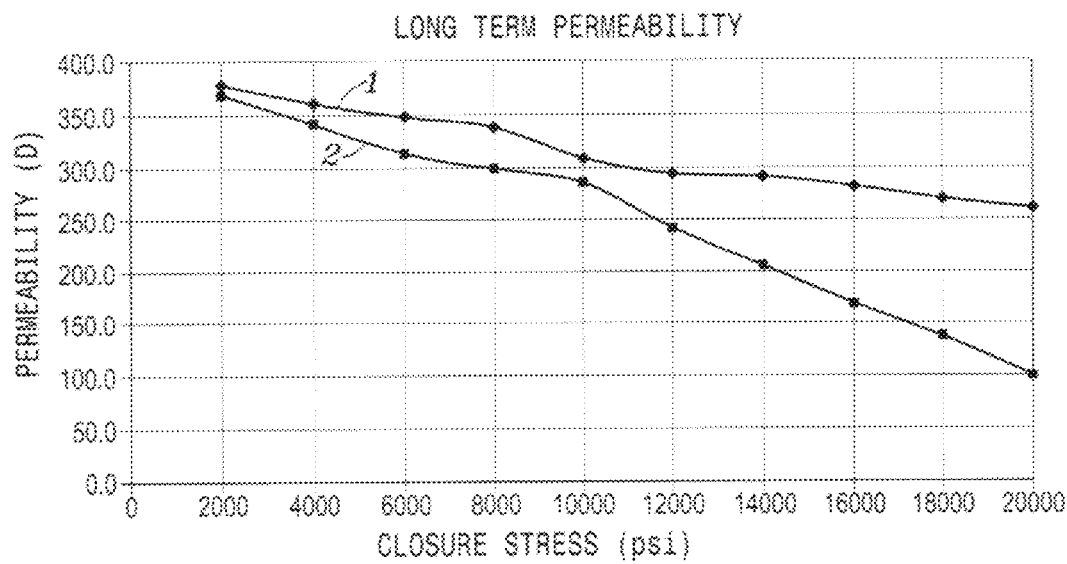
FIG. 5 is a graph of long term permeability as a function of stress of alumina pellets formed by the pellet-forming apparatus disclosed herein and by the prior art dry mixing process using an Eirich mixer.

FIG. 5 compares the permeability of pellets formed in the apparatus of FIG. 1 compared with pellets formed by the dry mixing process. The pellets from the two processes are identical in size and composition both being a high purity (99+%) alumina. The only variable is the pellet formation process. The permeabilities were measured in accordance with ISO 13503-5: "Procedures for Measuring the Long-term Conductivity of Proppants," except that steel wafers were used rather than sandstone wafers. The long term conductivity apparatus described in ISO 13503-5 utilizes a steel conductivity cell that contains an internal slot of dimensions 7 inches in length by 1.5 inches in width. An open port is placed in the cell extending from the each end of the slot to the exterior of the cell to allow for fluid flow through the slot. Other ports are placed along the length of the slot also extending to the exterior of the cell for the measurement of the internal pressure of the slot. Into this slot are fitted a lower and upper piston the lengths which extend out beyond the dimensions of the cell such that a load may be applied directly to the pistons by a hydraulic load frame. To load the conductivity cell for the measurement of conductivity the lower piston is first secured into the cell so as not to obstruct the fluid or pressure ports. A seal ring is installed to prevent pressure or fluid leakage between slot and the piston wall. A slot sized metal shim and a sandstone wafer are then placed on the lower piston. Alternatively a steel wafer may replace the sandstone wafer (as was the case here). A set amount of proppant is then placed on the wafer. In this case equal volumes of the two proppants were loaded representing initial pack widths of about 0.19 inches. The proppant is leveled. Then on top of the proppant is placed a second steel wafer, metal shim, -seal ring, and the upper piston. An initial load is applied to the pistons and fluid is flowed through the proppant pack while pressure is measured. The temperature of the fluid and cell was maintained at 250 degrees F. Measurement of the rate of fluid flow and pressure loss provides a measure of the proppant pack conductivity in millidarcy-feet. The permeability of the proppant pack is calculated by dividing the conductivity by the measured width of the pack, which was about 0.16-0.19 inch for the data shown in FIG. 5. The flowing fluid was a silica saturated deoxygenated aqueous solution of 2% KCl. Conductivity was measured at stresses of 2000 psi to 20,000 psi in increments of 2000 psi. In each case the stress was held for 50 hours before measuring the conductivity. Permeability of a proppant pack decreases as closure stress increases due to failure of the proppant grains. Stronger pellets will result in a higher permeability. As can be seen in FIG. 5, pellets made by dry mixing (line 2) lose 78% of their permeability as the closure stress increases from 2000 psi to 20,000 psi. By contrast the pellets made from the apparatus in FIG. 1 (line 1) lose only 31% of their permeability—less than one half of the permeability loss of the pellets made by dry mixing. This higher permeability of the pellets made from the apparatus of FIG. 1 is due to the improved strength of the pellet.

The strength of a proppant can be indicated from the proppant crush resistance test described in ISO 13503-2: "Measurement of Properties of Proppants Used in Hydraulic Fracturing and Gravel-packing Operations." In this test a sample of proppant is first sieved to remove any fines (undersized pellets or fragments that may be present), then placed in a crush cell where a piston then used to apply a confined closure stress of some magnitude above the failure point of some fraction of the proppant pellets. The sample is then re-sieved and weight percent of fines generated as a result of pellet failure is reported as percent crush. A comparison the percent crush of two equally sized samples is a method of gauging the relative strength. For the two samples of pellets used in the conductivity test described above the weight percent crush at 15,000 psi of the pellets produced by dry mixing was 2.7% as compared to 0.8% for the drip cast pellets. This again indicates that drip casting produces a stronger pellet.

Relative pellet strength can also be determined from single pellet strength measurements. Strength distributions of forty pellets from each of the two samples of pellets used in the conductivity test described above were measured, tabulated, and analyzed using Weibull statistics for the determination of a characteristic strength. The characteristic strength of the drip cast pellets so determined was 184 MPa as compared to 151 MPa for the pellets made by dry mixing.

Fracture mechanics teaches that pellets fail under stress from the largest flaw in the pellet. In proppant pellets, the largest flaw is believed to be the largest pore. Therefore, the stress at failure is inversely proportional to the square root of the size of the largest flaw. So, the ratio (R) of the stress at failure of a drip cast proppant (DC) formed by the apparatus disclosed herein to a conventionally (CONV) made proppant (dry mixing or spray fluid bed processes) would be:

$$R = (\text{Max pore size}_{DMP}/\text{Max pore size}_{CONV})^{1/2}$$

Pellets made by the drip casting process and prior art processes were examined by a scanning electron microscope (SEM) at a magnification of 500×. To measure pore size distribution in particles, cross-sections of sintered alumina, bauxite and kaolin pellets made by each process were examined in the SEM. For each sample, a random area of approximately 252 µm×171 µm from each of ten different pellets was photographed. The ten largest pores in each area were measured and the equation above was used to calculate the theoretical ratio of stress at failure of drip cast pellets versus conventionally made pellets. The results are presented in Table 3. For example, the average maximum pore size in the drip cast alumina pellets was 16.3 µm and for the dry mixing process alumina pellets average maximum pore size was 40.8 µm. Using the equation above, the ratio of the stress to failure of the drip cast pellets to the dry mixing process pellets is 1.6. Thus fracture mechanics predicts that drip cast high alumina pellets should withstand approximately 1.6 times more stress without fracturing than dry mixing process made pellets.

TABLE 3

Pore Sizes of Pellets Formed by Drip casting, Dry Mixing, and Spray Fluid Bed

|  | Alumina | | Bauxite | | Kaolin | |
| --- | --- | --- | --- | --- | --- | --- |
|  | Drip cast | Dry Mixed | Drip cast | Dry Mixed | Drip cast | Spray Fluid Bed |
| Average Largest Pore (µm) | 16.3 | 40.8 | 14.3 | 37.5 | 11.1 | 56.0 |
| Average of 10 Largest Pores (µm) | 10.4 | 19.1 | 9.1 | 20.5 | 6.0 | 18.4 |
| Theoretical Ratio of Drip cast Strength to Conventional Strength | 1.6× | | 1.6× | | 2.2 | |

Figure 6:
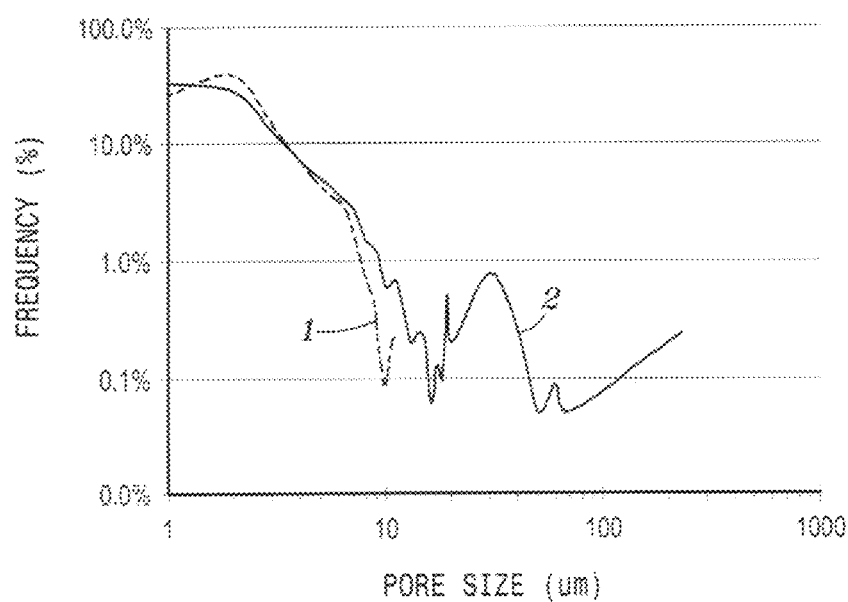
FIG. 6 is a frequency plot of pore size for particles of kaolin made by the method disclosed herein and by the prior art spray fluidized bed method.

Additional measurements were carried out on the kaolin samples. In these, every visible pore was measured and the composite data from all ten areas was used to calculate average pore size, standard deviation in pore size, and number of pores per square millimeter, as well as the largest pore data, which are presented in Table 3. A summary of the data is presented in Table 4, and FIG. 6 shows plots of the pore size distributions for drip cast kaolin (Curve 1) and spray fluid bed kaolin (Curve 2). The small percentage of very large pores generated by the spray fluid bed process shown in FIG. 6 (Curve 2) are readily visible in the microstructures in FIG. 4f. The lack of large pores in the drip cast material provides the strength advantage discussed above.

TABLE 4

Additional Pore Size Measurements for
Drip cast and Spray Fluid Bed Kaolin

| | Drip cast Kaolin | Spray Fluid Bed Kaolin |
|---|---|---|
| Average Pore Size (μm) | 2.0 | 2.8 |
| Standard Deviation in Pore Size (μm) | 1.8 | 6.4 |
| Average Number of Pores Per Square Millimeter | 2121 | 5133 |

It is understood that modifications to the invention may be made as might occur to one skilled in the field of the invention within the scope of the appended claims. All embodiments contemplated hereunder which achieve the objects of the invention have not been shown in complete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

We claim:

1. A method for making proppant particles, comprising:
providing a slurry of ceramic raw material, the slurry containing a reactant comprising a polysaccharide, wherein the slurry has a solids content from about 25 wt % to about 75 wt %;
flowing the slurry through a nozzle in a gas while vibrating the slurry to form droplets in the gas, wherein the slurry of ceramic raw material flows through the nozzle at a rate of about 1 to about 15 kg/(mm$^2$×hr);
utilizing a surface tension of the slurry with the gas to cause the droplets to acquire and maintain a spherical shape until contact with an upper surface of a liquid, wherein gelling commences in the droplets upon contact with the liquid to provide gelled droplets, and wherein the liquid contains a coagulation agent that reacts with the reactant in the slurry to cause gelling of the reactant in the droplets;
transferring the gelled droplets from the liquid;
drying the gelled droplets to form green pellets; and
sintering the green pellets in a selected temperature range to form the proppant particles.

2. The method of claim 1 wherein a permeability of a pack of the proppant particles decreases less than fifty percent (50%) when a stress applied to the pack of particles increases from 2,000 psi to 20,000 psi.

3. The method of claim 1 wherein the polysaccharide is an alginate.

4. The method of claim 1 wherein the coagulation agent is calcium chloride.

5. The method of claim 1 wherein the reactant and the coagulation agent react to form a semi-solid surface on the droplets.

6. The method of claim 1 wherein the slurry is vibrated as it flows from the nozzle by vibrating the nozzle.

7. The method of claim 1 wherein the ceramic raw material is selected from the group consisting of bauxite, kaolin, and alumina, and mixtures thereof.

8. The method of claim 1 wherein the gas is air.

9. The method of claim 1 wherein the proppant particles have an average largest pore size of less than about 20 microns.

10. The method of claim 1 wherein the proppant particles have an average roughness of less than about 2 microns.

11. The method of claim 1 wherein the proppant particles are formed without subjecting the droplets to a sol-gel reaction.

12. The method of claim 1 wherein the particles are sintered at a temperature in the range from about 1400° C. to about 1650° C.

13. The method of claim 1 wherein the proppant particles are formed without subjecting the droplets to a reaction gas free-fall zone.

14. The method of claim 1 wherein the proppant particles are formed without subjecting the droplets to a sol-gel reaction or a reaction gas free-fall zone.

15. A method for making proppant particles, comprising:
providing a slurry of alumina, the slurry containing a reactant comprising a polysaccharide, wherein the slurry has a solids content from about 25 wt % to about 75 wt %;
flowing the slurry through a nozzle in a gas while vibrating the slurry to form droplets in the gas, wherein the slurry of alumina flows through the nozzle at a rate of about 1 to about 15 kg/(mm$^2$×hr);
utilizing a surface tension of the slurry with the gas to cause the droplets to acquire and maintain a spherical shape until contact with an upper surface of a liquid, wherein gelling commences in the droplets upon contact with the liquid to provide gelled droplets, and wherein the liquid contains a coagulation agent that reacts with the reactant in the slurry to cause gelling of the reactant in the droplets;
transferring the gelled droplets from the liquid;
drying the gelled droplets to form green pellets; and
sintering the green pellets in a selected temperature range to form the proppant particles.

16. The method of claim 15 wherein the polysaccharide is an alginate.

17. The method of claim 15 wherein the coagulation agent is calcium chloride.

18. The method of claim 15 wherein the reactant and the coagulation agent react to form a semi-solid surface on the droplets.

19. The method of claim 15 wherein the slurry is vibrated as it flows from the nozzle by vibrating the nozzle.

20. The method of claim 15 wherein the gas is air.

21. The method of claim 15 wherein the proppant particles have an average largest pore size of less than about 20 microns.

22. The method of claim 15 wherein the proppant particles have an average roughness of less than about 2 microns.

23. The method of claim 15 wherein the proppant particles are formed without subjecting the droplets to a sol-gel reaction.

24. The method of claim 15 wherein the particles are sintered at a temperature in the range from about 1400° C. to about 1650° C.

25. The method of claim 15 wherein the proppant particles are formed without subjecting the droplets to a reaction gas free-fall zone.

26. The method of claim 15 wherein the proppant particles are formed without subjecting the droplets to a sol-gel reaction or a reaction gas free-fall zone.

27. The method of claim 15 wherein a permeability of a pack of the proppant particles decreases less than fifty percent (50%) when a stress applied to the pack of particles increases from 2,000 psi to 20,000 psi.

* * * * *